(12) United States Patent
Go et al.

(10) Patent No.: US 12,255,958 B2
(45) Date of Patent: Mar. 18, 2025

(54) ON-BOARD RELAY DEVICE, INFORMATION PROCESSING METHOD, AND PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP); TOYOTA JIDOSHA KABUSHIKI KAISHA, Toyota (JP)

(72) Inventors: Darmawan Go, Yokkaichi (JP); Hideki Maeda, Yokkaichi (JP); Takeshi Hagihara, Yokkaichi (JP); Yosuke Shimizu, Yokkaichi (JP); Tatsuya Izumi, Osaka (JP); Hirofumi Urayama, Osaka (JP); Masashi Amesara, Toyota (JP); Hisashi Furukawa, Toyota (JP); Shu Ishizuka, Toyota (JP); Hideki Goto, Toyota (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 17/995,502

(22) PCT Filed: Mar. 15, 2021

(86) PCT No.: PCT/JP2021/010411
§ 371 (c)(1),
(2) Date: Oct. 5, 2022

(87) PCT Pub. No.: WO2021/205819
PCT Pub. Date: Oct. 14, 2021

(65) Prior Publication Data
US 2023/0179659 A1    Jun. 8, 2023

(30) Foreign Application Priority Data
Apr. 6, 2020   (JP) ................................ 2020-068553

(51) Int. Cl.
*H04L 67/12*   (2022.01)
*G06F 8/65*    (2018.01)

(52) U.S. Cl.
CPC ................ *H04L 67/12* (2013.01); *G06F 8/65* (2013.01)

(58) Field of Classification Search
None
See application file for complete search history.

(56) References Cited

U.S. PATENT DOCUMENTS

| 10,397,022 B2 * | 8/2019 | Kataoka | ................. H04L 12/40 |
| 10,599,418 B2 * | 3/2020 | Kiyama | ................. H04L 67/12 |

(Continued)

OTHER PUBLICATIONS

International Search Report, Application No. PCT/JP2021/010411, mailed May 25, 2021. ISA/Japan Patent Office.

*Primary Examiner* — Todd Melton
(74) *Attorney, Agent, or Firm* — Honigman, LLP

(57) ABSTRACT

A plurality of communication units of an on-board relay device include a remote communication unit to which a communication device outside a vehicle for communicating with an external server is connected, and a local communication unit to which a diagnostic device is connected, and a control unit of the on-board relay device performs lower layer side control for relay based on a lower side layered protocol in communication, and upper layer side control for relay based on an upper side layered protocol rather than the lower side layered protocol, and performs adjustment pro- (Continued)

cessing with respect to a conflict of a plurality of maintenance processings by the upper layer side control when information relevant to the plurality of maintenance processings with respect to any one on-board ECU of a plurality of on-board ECUs is input through the local communication unit and the remote communication unit.

17 Claims, 5 Drawing Sheets

(56) References Cited

U.S. PATENT DOCUMENTS

| | | | |
|---|---|---|---|
| 10,742,740 B2* | 8/2020 | Kakiya | H04L 12/40136 |
| 11,144,295 B2* | 10/2021 | Arai | G06F 13/00 |
| 11,340,891 B2* | 5/2022 | Ogawa | H04L 67/34 |
| 11,403,087 B2* | 8/2022 | Lin | H04L 67/34 |
| 2017/0139778 A1 | 5/2017 | Kito et al. | |
| 2018/0227147 A1 | 8/2018 | Kataoka et al. | |
| 2018/0267922 A1 | 9/2018 | Nara et al. | |
| 2020/0005829 A1 | 1/2020 | Hasegawa et al. | |
| 2021/0117177 A1 | 4/2021 | Noda | |

* cited by examiner

| Port number | Relay layer |
|---|---|
| 6900–6999 | Upper-layer relay unit |
| 1–150 | Layer 3 relay unit |
| 151–6899 | Layer 2 relay unit |

FIG. 3

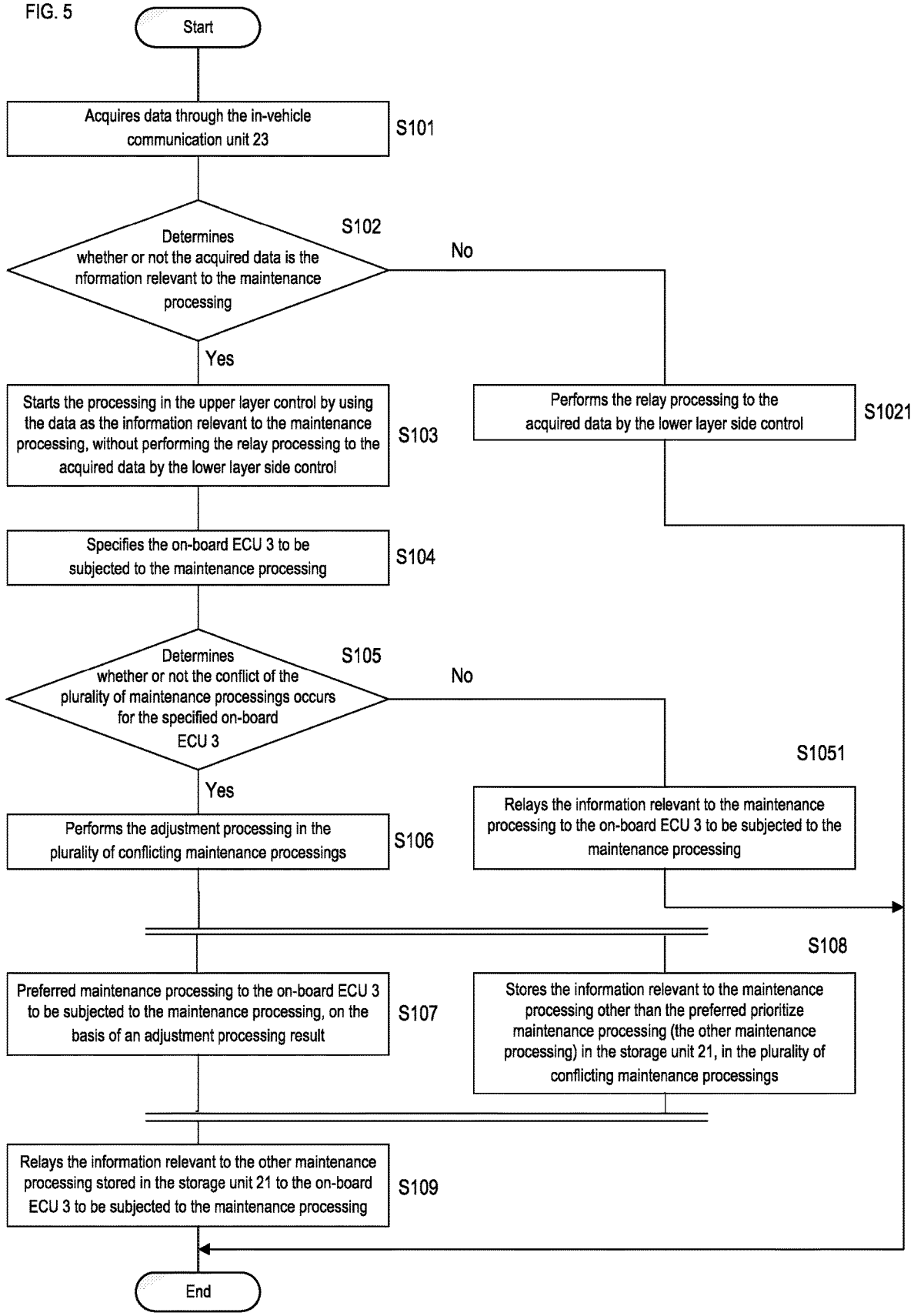

ON-BOARD RELAY DEVICE, INFORMATION PROCESSING METHOD, AND PROGRAM

CROSS-REFERENCE TO RELATED APPLICATIONS

This application is the U.S. national stage of PCT/JP2021/010411 filed on Mar. 15, 2021, which claims priority of Japanese Patent Application No. JP 2020-068553 filed on Apr. 6, 2020, the contents of which are incorporated herein.

TECHNICAL FIELD

The present technology relates to an on-board relay device, an information processing method, and a program.

BACKGROUND

An on-board electronic control unit (ECU) for controlling an on-board device such as a powertrain system of engine control or the like, and a body system of air conditioner control or the like is mounted on a vehicle. The on-board ECU includes an arithmetic processing unit such as MPU, a rewritable non-volatile storage unit such as RAM, and a communication unit for communicating with other on-board ECUs, and controls the on-board device by reading and executing a control program stored in the storage unit. Further, the vehicle is equipped with a relay device having a wireless communication function, and thus, is capable of communicating with a program providing device to be connected to a network outside the vehicle through the relay device, of downloading (receiving) the control program of the on-board ECU from the program providing device, and of updating the control program of the on-board ECU (for example, refer to Japanese Patent Application Laid-Open No. 2017-97851).

In the relay device of Japanese Patent Application Laid-Open No. 2017-97851, the matters relevant to a countermeasure against a case where maintenance processing such as update or the like with respect to the on-board ECU that is connected to an relay device is performed from a device connected to a plurality of different communication units are not considered, and thus, there is a concern that it is not possible to efficiently implement the maintenance processing with respect to the on-board ECU.

An object of the present disclosure is to provide an on-board relay device in which it is possible to efficiently relay information relevant to maintenance processing with respect to an on-board ECU that is connected to the on-board relay device (an own device).

SUMMARY

An on-board relay device according to one aspect of the present disclosure is an on-board relay device to be mounted on a vehicle, the device including: a plurality of communication units for communicating with a plurality of on-board ECUs to be mounted on the vehicle and an external device outside the vehicle; and a control unit performing control relevant to relay of communication between the plurality of on-board ECUs, in which the external device includes an external server and a diagnostic device, the plurality of communication units include a remote communication unit to which a communication device outside the vehicle for communicating with the external server is connected, and a local communication unit to which the diagnostic device is connected, and the control unit performs lower layer side control for relay based on a lower side layered protocol in communication, and upper layer side control for relay based on an upper side layered protocol rather than the lower side layered protocol, and performs adjustment processing with respect to a conflict of a plurality of maintenance processings by the upper layer side control when information relevant to the plurality of maintenance processings with respect to any one on-board ECU of the plurality of on-board ECUs is input through the local communication unit and the remote communication unit.

Advantageous Effects

According to one aspect of the present disclosure, it is possible to provide an on-board relay device or the like in which it is possible to efficiently relay information relevant to maintenance processing with respect to an on-board ECU that is connected to the on-board relay device (an own device).

BRIEF DESCRIPTION OF THE DRAWINGS

FIG. 2 is a block diagram illustrating a configuration of the on-board relay device or the like.

FIG. 3 is an explanatory diagram illustrating one aspect of a layer control decision table included in relay control information.

FIG. 5 is a flowchart illustrating processing of a control unit of the on-board relay device according to this embodiment.

DETAILED DESCRIPTION OF PREFERRED EMBODIMENTS

Figure 1:
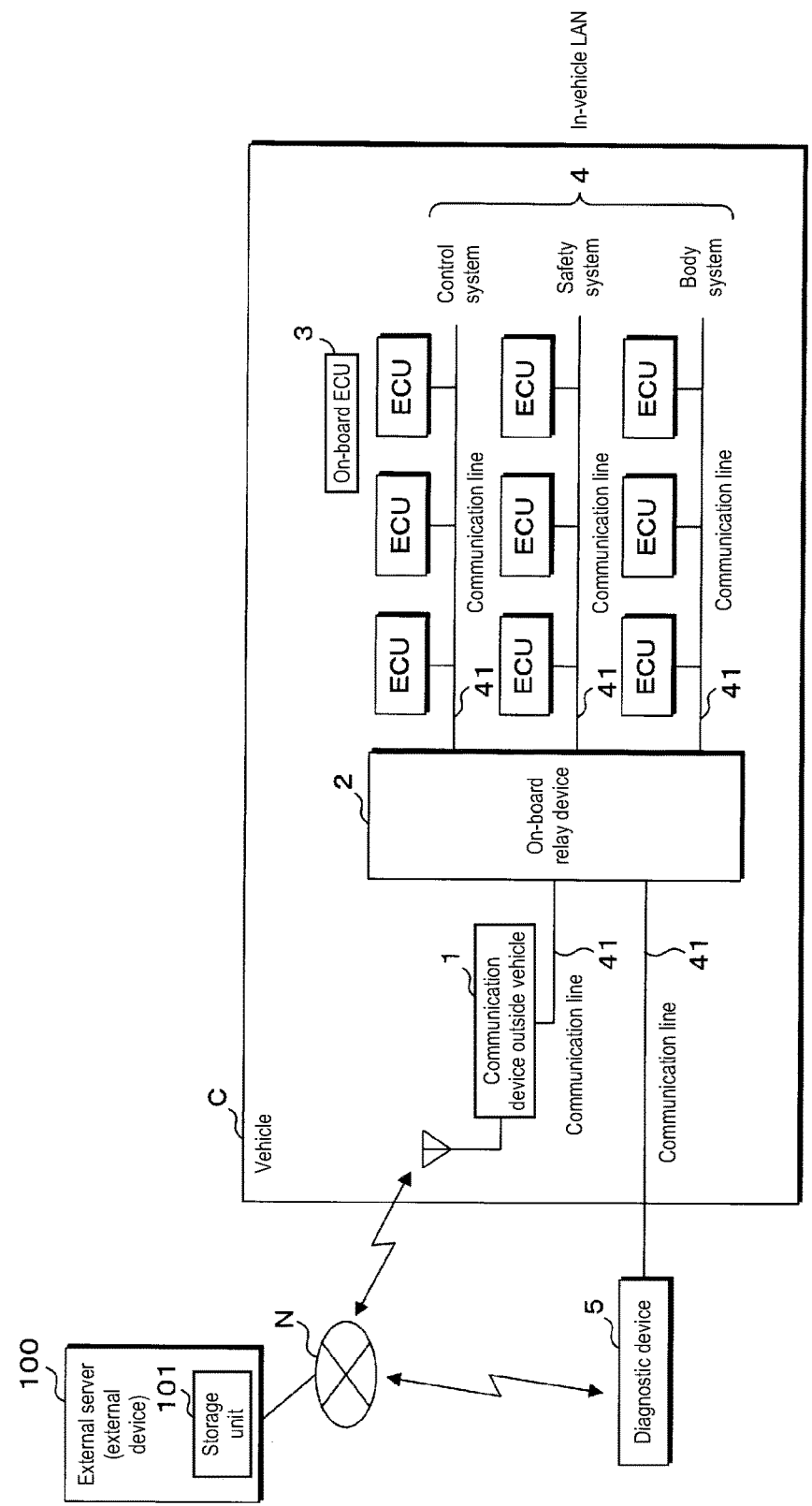
FIG. 1 is a schematic view illustrating a configuration of an on-board system including an on-board relay device according to Embodiment 1.

First, embodiments of the present disclosure will be listed and described. In addition, at least a part of the embodiments described below may be arbitrarily combined.

First Aspect

An on-board relay device according to a first aspect of the present disclosure is an on-board relay device to be mounted on a vehicle, the device including: a plurality of communication units for communicating with a plurality of on-board ECUs to be mounted on the vehicle and an external device outside the vehicle; and a control unit performing control relevant to relay of communication between the plurality of on-board ECUs, in which the external device includes an external server and a diagnostic device, the plurality of communication units include a remote communication unit to which a communication device outside the vehicle for communicating with the external server is connected, and a local communication unit to which the diagnostic device is connected, and the control unit performs lower layer side control for relay based on a lower side layered protocol in communication, and upper layer side control for relay based on an upper side layered protocol rather than the lower side layered protocol, and performs adjustment processing with respect to a conflict of a plurality of maintenance processings by the upper layer side control when information relevant to the plurality of maintenance processings with respect to any one on-board ECU of the plurality of on-board ECUs is input through the local communication unit and the remote communication unit.

In the first aspect, the control unit of the on-board relay device performs the lower layer side control for the relay based on the lower side layered protocol and the upper layer side control for the relay based on the upper side layered protocol in order to relay the communication between the on-board ECUs and the communication between the external device outside the vehicle and the on-board ECU. When the control unit relays the information relevant to the maintenance processing output (transmitted) from the external device to the on-board ECU to be subjected to the maintenance processing, the relay is performed by the upper layer side control. In a case where the information relevant to the maintenance processing is transmitted through different communication units such as the local communication unit and the remote communication unit, the control unit also performs processing (the adjustment processing) relevant to the adjustment of such conflicting maintenance processings, as the processing in the upper layer side control. Accordingly, even in a case where the control unit, for example, includes a hardware processing unit such as FPGA or ASCI, and a software processing unit such as CPU or a microcomputer, the lower layer side control is performed by the hardware processing unit, and the upper layer side control is performed by the software processing unit, the adjustment processing is performed by the software processing unit in charge of performing the upper layer side control, and the adjustment processing can be reliably performed. Accordingly, even in a case where the information relevant to the plurality of maintenance processings is transmitted through different communication units, it is possible to reliably perform the adjustment in the plurality of maintenance processings, and to efficiently implement maintenance processing to be preferentially performed.

Second Aspect

In the on-board relay device according to a second aspect of the present disclosure, the maintenance processing includes update processing of a program that is executed by the on-board ECU, and diagnostic processing or initialization processing with respect to the on-board ECU.

In the second aspect, since the maintenance processing includes the update processing of the program that is executed by the on-board ECU, and the diagnostic processing or the initialization processing with respect to the on-board ECU, even in a case where different maintenance processings conflict for an on-board ECU to be subjected to the maintenance processing, the maintenance processing can be adjusted, and the conflict of the update processing of the program, and the diagnostic processing or the initialization processing can be reliably avoided.

Third Aspect

In the on-board relay device according to a third aspect of the present disclosure, a hierarchy in the communication is a hierarchy based on an open systems interconnection (OSI) model, the lower side layered protocol is a protocol of a data link layer or a network layer, and the upper side layered protocol is a protocol of a presentation layer or an application layer.

In the third aspect, the on-board relay device, and the on-board ECU and the external device perform hierarchical communication based on the OSI model, the lower side layered protocol is the protocol of the data link layer or the network layer, and the upper side layered protocol is the protocol of the presentation layer or the application layer. Accordingly, the on-board relay device functions as a layer 2 or layer 3 switch, and functions as a relay device corresponding to an upper layer. Accordingly, relay processing relevant to information other than the information relevant to the maintenance processing can be performed at a high speed by the layer 2 or layer 3, and the relay of the information relevant to the maintenance processing and the adjustment of the maintenance processing can be efficiently performed by an application or the like for performing relay corresponding to the upper layer.

Fourth Aspect

In the on-board relay device according to fourth aspect of the present disclosure, a protocol of communication with the external device that is performed through the remote communication unit and the local communication unit is TCP/IP, and the control unit specifies communication with the diagnostic device or the external server on the basis of a port number in TCP/IP.

In the fourth aspect, the on-board relay device communicates with the on-board ECU or the external device by a TCP/IP protocol, and the control unit specifies the communication with the diagnostic device or the external server, on the basis of the port number such as a TCP port number or a UDP port number in TCP/IP. Accordingly, the control unit is capable of extracting the port number that is stored in a header part or the like of an IP packet received through the communication unit to which the external device is connected, and of easily specifying the information relevant to the maintenance processing transmitted from the external device, on the basis of the port number. In a case where there are different port numbers in the information relevant to the maintenance processing transmitted from each of the diagnostic device and the external server that are the external devices, the control unit is capable of easily specifying whether the information relevant to the maintenance processing is transmitted from the diagnostic device or the external server, on the basis of the port number.

Fifth Aspect

In the on-board relay device according to a fifth aspect of the present disclosure, when information relevant to maintenance processing with respect to any one on-board ECU of the plurality of on-board ECUs is input through the local communication unit and the remote communication unit, the control unit preferentially performs the adjustment processing to information relevant to maintenance processing output from the external device in which connection is previously established, with the any one on-board ECU.

In the fifth aspect, in a case where the information relevant to the maintenance processing with respect to any one on-board ECU of the plurality of on-board ECUs is input through the local communication unit and the remote communication unit, that is, in a case where the conflict of the maintenance processings occurs, the control unit preferentially performs the adjustment processing to the information relevant to the maintenance processing input from the external device in which TCP connection is previously established. Accordingly, even in a case where the conflict of the plurality of maintenance processings occurs for any one on-board ECU, the communication with the external device in which the TCP connection with the on-board ECU is previously established can be continued without being interrupted or blocked, and the maintenance processing transmitted from the external device can be reliably executed.

Sixth Aspect

In the on-board relay device according to a sixth aspect of the present disclosure, the protocol of the communication with the external device that is performed through the remote communication unit and the local communication unit is based on unified diagnostic services (UDS), and when information relevant to maintenance processing with respect to any one on-board ECU of the plurality of on-board ECUs is input through the local communication unit and the remote communication unit, the control unit performs the adjustment processing on the basis of a service ID in the UDS.

In the seventh aspect, the on-board relay device communicates with the on-board ECU and the external device by a UDS protocol (UDSonIP) based on ISO 14229-1, and in a case where the conflict of the maintenance processings occurs, the control unit performs the adjustment processing on the basis of the service ID in the UDS. The service ID (SID) in the UDS is classified into functional groups such as diagnosis, communication management, and data transmission, and the control unit is capable of performing adjustment in a plurality of conflicting maintenance processings, on the basis of the importance of a function corresponding to the service ID, an influence rate with respect to the vehicle, and the like.

Seventh Aspect

An information processing method according to a seventh aspect of the present disclosure is an information processing method allowing a computer to execute processing of: executing lower layer side control for relay based on a lower side layered protocol in communication, and upper layer side control for relay based on an upper side layered protocol rather than the lower side layered protocol; and adjusting a conflict of a plurality of maintenance processings by the upper layer side control when information relevant to the plurality of maintenance processings with respect to any one on-board ECU is input through a local communication unit for communicating with a diagnostic device and a remote communication unit for communicating with an external server.

In the seventh aspect, it is possible to provide the information processing method in which the information relevant to the maintenance processing with respect to the on-board ECU that is connected to the on-board relay device can be efficiently relayed by the computer.

Eighth Aspect

A program according to an eighth aspect of the present disclosure is a program for allowing a computer to execute processing of: executing lower layer side control for relay based on a lower side layered protocol in communication, and upper layer side control for relay based on an upper side layered protocol rather than the lower side layered protocol; and adjusting a conflict of a plurality of maintenance processings by the upper layer side control when information relevant to the plurality of maintenance processings with respect to any one on-board ECU is input through a local communication unit for communicating with a diagnostic device and a remote communication unit for communicating with an external server.

In the eighth aspect, the computer can be used as an on-board relay device in which the information relevant to the maintenance processing with respect to the on-board ECU that is connected to the on-board relay device is efficiently relayed.

Hereinafter, specific examples of an on-board relay device 2 according to an embodiment of the present disclosure will be described with reference to the drawings.

Embodiment 1

Figure 2:
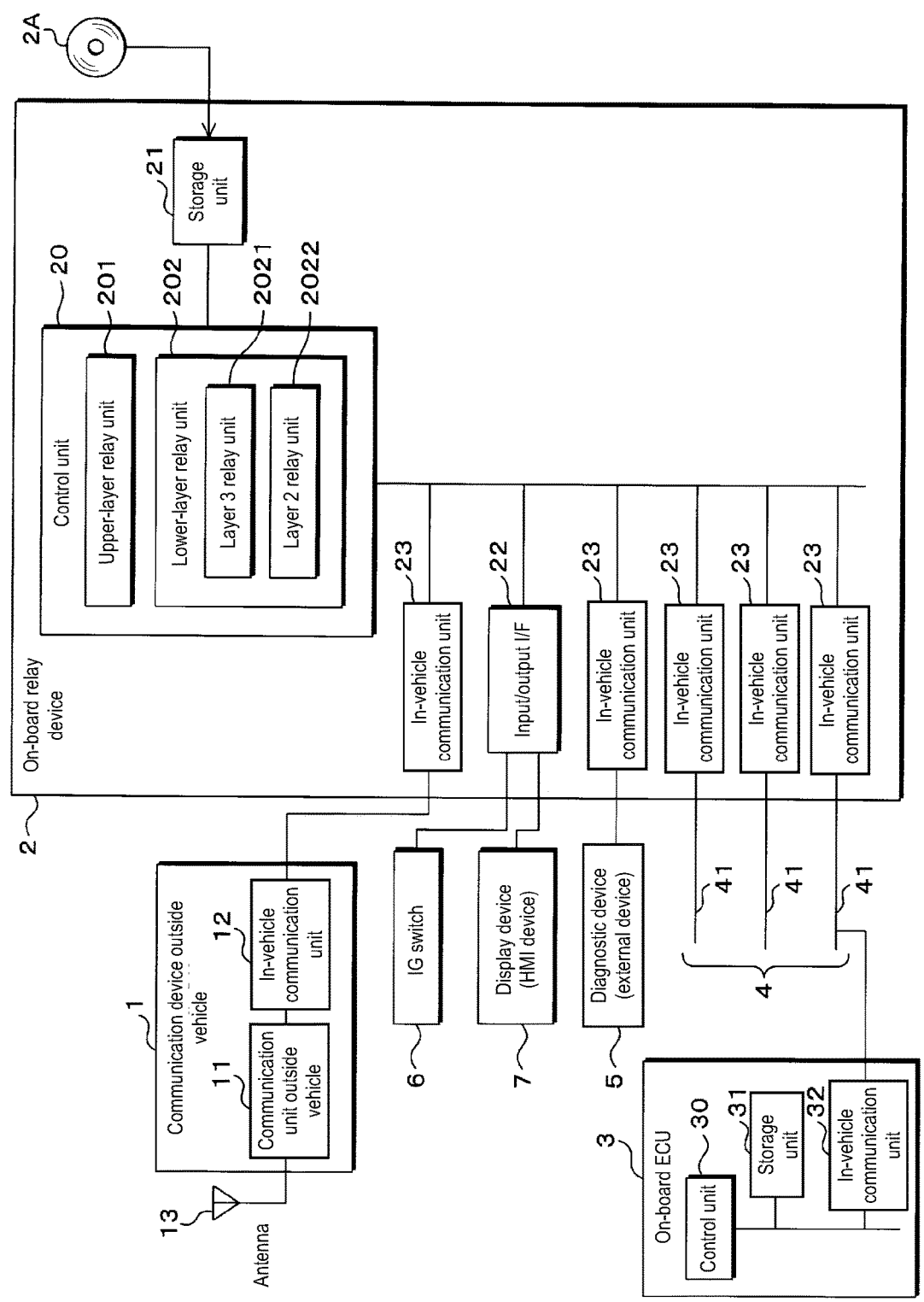

Hereinafter, an embodiment will be described on the basis of the drawings. FIG. 1 is a schematic view illustrating the configuration of an on-board system including an on-board relay device 2 according to Embodiment 1. FIG. 2 is a block diagram illustrating the configuration of the on-board relay device 2 or the like. The on-board system includes a communication device 1 outside a vehicle that is mounted on a vehicle C, and the on-board relay device 2, and the on-board relay device 2 communicates with an external server 100 through the communication device 1 outside the vehicle. The on-board relay device 2 communicates with a diagnostic device 5 that is directly connected to the on-board relay device.

The external server 100 and the diagnostic device 5 correspond to an external device performing processing relevant to maintenance with respect to an on-board ECU 3 (maintenance processing) such as the update of a program of the on-board ECU 3. The maintenance processing is not limited to the update (reproduction) of the program with respect to the on-board ECU 3, and for example, may include diagnostic processing, initialization processing, re-activation processing, and the like with respect to the on-board ECU 3. In addition, the maintenance processing that is performed by the external device, for example, may be based on a diagnostic communication protocol that is defined by unified diagnostic services (UDS).

The on-board relay device 2 acquires an update program of the on-board ECU 3 to be a maintenance target from the external server 100 and the diagnostic device 5, or acquires information relevant to the maintenance processing, such as a request signal of initialization processing to the on-board ECU 3 to be the maintenance target, and relays the acquired update program, or the acquired information relevant to the maintenance processing, such as the request signal of the initialization processing, to the on-board ECU 3 to be the maintenance target. The on-board relay device 2 may acquire a program or the like of the on-board ECU 3 that is connected to the own device from the external server 100 and the diagnostic device 5, may output (transmit) the acquired program or the like to the on-board ECU 3 to be an update target (a reproduction target), and may function as a reproduction master performing update processing (reproduction processing) of the program of the on-board ECU 3.

The external server 100, for example, is a computer such as a server that is connected to a network N outside the vehicle such as the internet or a public network, and includes a storage unit 101 such as a random access memory (RAM), a read only memory (ROM), or a hard disk. The storage unit 101 stores a program or data for controlling the on-board ECU 3 that is created by a manufacturer or the like of the on-board ECU 3. The program or the data is transmitted to the vehicle C as the update program, and is used to update the program of the on-board ECU 3 mounted on the vehicle C. The external server 100 configured as described above is also referred to as an over the air (OTA) server.

The diagnostic device 5 is a device (a diagnostic tool) that is used by a vehicle maintenance operator including a qualified dealer who is in charge of maintaining the vehicle C such as a maintenance operation of the on-board relay device 2 or the on-board ECU 3, or the like, and for example, is a device in which a dedicated application is installed in a general information terminal such as a personal computer, a tablet PC, or a smart phone, or a device configured as a dedicated information terminal including hardware. As with the on-board ECU 3 described below, the diagnostic device 5 includes a control unit (not illustrated) such as CPU or MPU, a storage unit (not illustrated), and an in-vehicle communication unit 23 (not illustrated). The diagnostic device 5 communicates with the on-board relay device 2 through the in-vehicle communication unit 23 (a local communication unit). As with the external server 100, the storage unit of the diagnostic device 5 stores a program or data for controlling the on-board ECU 3 that is created by the manufacturer or the like of the on-board ECU 3. As with a case of the external server 100, the program or the data stored in the diagnostic device 5 is transmitted to the vehicle C as the update program, and is used to update the program of the on-board ECU 3 mounted on the vehicle C.

The communication device 1 outside the vehicle, the on-board relay device 2, a display device 7, and a plurality of on-board ECUs 3 for controlling various on-board devices are mounted on the vehicle C. The communication device 1 outside the vehicle and the on-board relay device 2, for example, are connected by a communication line 41 (an Ethernet cable) corresponding to a communication protocol such as Ethernet (Registered Trademark) such that communication can be performed. The on-board relay device 2 and the on-board ECU 3 are connected by the communication line 41 and an in-vehicle LAN 4 corresponding to a communication protocol such as Ethernet such that communication can be performed. The connection between the on-board relay device 2 and the on-board ECU 3 is not limited to Ethernet, and for example, may be a CAN bus corresponding to a communication protocol such as Control Area Network (CAN: Registered Trademark).

The communication device 1 outside the vehicle includes a communication unit 11 outside the vehicle and an in-vehicle communication unit 12. The in-vehicle communication unit 12, for example, is an Ethernet PHY unit corresponding to a TCP/IP packet that is transmitted by a communication line 41 using an Ethernet cable such as 100 BASE-T1 or 1000 BASE-T1. The communication device 1 outside the vehicle is connected to the on-board relay device 2 through the in-vehicle communication unit 12 and the communication line 41 such as an Ethernet cable such that communication can be performed.

The communication unit 11 outside the vehicle is a communication device for wireless communication using a mobile communication protocol such as 3G, LTE, 4G, 5G, and WiFi, and transmits and receives data with respect to the external server 100 through an antenna 13 that is connected to the communication unit 11 outside the vehicle. The communication between the communication device 1 outside the vehicle and the external server 100, for example, is performed through the network N outside the vehicle such as a public network or the internet.

In this embodiment, the communication device 1 outside the vehicle is a separate device from the on-board relay device 2, and connects the devices by the in-vehicle communication unit 12 or the like such that communication can be performed, but is not limited thereto. The communication device 1 outside the vehicle may be built in the on-board relay device 2 as one component of the on-board relay device 2.

As illustrated in FIG. 2, the on-board relay device 2 includes a control unit 20, a storage unit 21, an input/output I/F 22, an in-vehicle communication unit 23, and the like. The on-board relay device 2, for example, controls segments of systems, such as the on-board ECU 3 of a control system, the on-board ECU 3 of a safety system, and the on-board ECU 3 of a body system, by a plurality of communication lines 41, and relays communication in the on-board ECUs 3 between the segments. The on-board relay device 2, for example, is a gateway or an Ether-switch, and may function as a layer 2 switch, a layer 3 switch, and a CAN gateway. The on-board relay device 2, for example, may be configured as one function unit of a body ECU controlling the entire vehicle C, an automated driving ECU controlling automated driving, or the like. The on-board relay device 2 may be a power lan box (PLB) functioning as a power distribution device that distributes and relays power output from an electrical storage device (not illustrated), and supplies the power to the on-board ECU 3 that is connected to the own device, in addition to the relay relevant to the communication.

The control unit 20 includes a central processing unit (CPU), a micro processing unit (MPU), or the like. The control unit 20 reads out and executes each of programs and data pieces stored in advance in the storage unit 21, and performs various control processings, arithmetic processings, and the like. Note that, hereinafter, a program and data required for executing the program can be included in the term of "program".

The control unit 20 is not limited to a software processing unit such as CPU or a microcomputer that reads a program and executes software processing, and may include a hardware processing unit such as FPGA or ASCI that executes hardware processing. Even though the details will be described below, the control unit 20, for example, includes an upper-layer relay unit 201 performing processing relevant to relay control in an upper layer (upper layer side control) of an OSI7 hierarchy reference model, and a lower-layer relay unit 202 performing processing relevant to relay control in a lower layer (lower layer side control). In a case where the control unit 20 includes the software processing unit such as CPU, and the hardware processing unit such as FPGA, the software processing unit such as CPU may be in charge of the upper layer side control, and the hardware processing unit such as FPGA may be in charge of the lower layer side control.

The storage unit 21 includes a volatile memory element such as a random access memory (RAM), or a non-volatile memory element such as a read only memory (ROM), an electrically erasable programmable ROM (EEPROM), or a flash memory. In the storage unit 21, relay control information that is referred to by the control unit 20 to perform the relay control is stored, for example, in a table format. Even though the details will be described below, the relay control information, for example, includes route information table that is used in the lower layer side control, a preferential information table that is used in the upper layer side control, and a layer control decision table for deciding which layer control is performed to the acquired data. When the on-board relay device 2 relays data that is transmitted and received between the on-board ECUs 3, the storage unit 21 may be used as a network buffer area for temporarily storing the data. Further, the storage unit 21 may store vehicle configuration information of the on-board relay device 2 and all the on-board ECUs 3 mounted on the vehicle C. The vehicle configuration information, for example, may include a vehicle identification number (VIN) of the vehicle C, the model of the on-board relay device 2 and the on-board ECU 3, the name, the version number, and the like of the program that is mounted.

The input/output I/F 22, for example, is a communication interface for serial communication. The on-board relay device 2 is connected to the display device 7 such as a display and an IG switch 6 for activating and stopping the vehicle through the input/output I/F 22 such that communication can be performed.

The in-vehicle communication unit 23, for example, is an input/output interface including an Ethernet PHY unit using an Ethernet communication protocol, and the control unit 20 communicates with the on-board ECU 3 that is connected to the in-vehicle LAN 4 through the in-vehicle communication unit 23, the on-board device such as the communication device 1 outside the vehicle and other relay devices, or the diagnostic device 5. Alternatively, the in-vehicle communication unit 23 is not limited to the Ethernet PHY unit, and for example, may be a CAN transceiver using a communication protocol such as CAN.

There are a plurality of in-vehicle communication units 23, and the communication line 41 configuring the in-vehicle LAN 4 is connected to each of the in-vehicle communication units 23. As described above, by providing the plurality of in-vehicle communication units 23, the in-vehicle LAN 4 is divided into a plurality of segments, and connects the on-board ECU 3 to each of the segments in accordance with the function of the on-board ECU 3 (a control system function, a safety system function, and a body system function).

The diagnostic device 5 and the communication device 1 outside the vehicle for communicating with the external server 100 are further connected to the in-vehicle communication unit 23, and communication with an external device such as the diagnostic device 5 and the external server 100 is performed. That is, the in-vehicle communication unit 23 to which the diagnostic device 5 or the communication device 1 outside the vehicle is connected corresponds to a communication unit for an external device for communicating with an external device outputting the information relevant to the maintenance processing. Accordingly, the in-vehicle communication unit 23 to which the diagnostic device 5 is connected corresponds to a local communication unit. The in-vehicle communication unit 23 to which the communication device 1 outside the vehicle for communicating with the external server 100 is connected corresponds to a remote communication unit.

The on-board ECU 3 includes a control unit 30, a storage unit 31, and an in-vehicle communication unit 32. The storage unit 31 includes a volatile memory element such as a random access memory (RAM), or a non-volatile memory element such as a read only memory (ROM), an electrically erasable programmable ROM (EEPROM), or a flash memory, and stores the program or the data of the on-board ECU 3. The control unit 30 includes a central processing unit (CPU), a micro processing unit (VIPU), or the like, performs control processing or the like by reading out and executing the program and the data stored in the storage unit 31, and controls the on-board device including the on-board ECU 3, an actuator, or the like.

The ignition switch (IG switch) 6 for activating or stopping the vehicle C is connected to the input/output I/F 22 of the on-board relay device 2 by a wire harness such as a serial cable such that communication can be performed. In a case where the IG switch 6 is On or Off, the control unit 20 of the on-board relay device 2 acquires (receives) a signal output (transmitted) from the IG switch 6 through the input/output I/F 22.

The display device 7, for example, is a human machine interface (HMI) device such as a car navigation display. The display device 7 is connected to the input/output I/F 22 of the on-board relay device 2 by a harness such as a serial cable such that communication can be performed. The data or the information output from the control unit 20 of the on-board relay device 2 through the input/output I/F 22 is displayed on the display device 7.

As described above, the storage unit 21 of the on-board relay device 2 stores the relay control information that is referred to by the control unit 20 to perform the relay control, for example, in the table format. The relay control information, for example, includes the route information table that is used in the lower layer side control, the preferential information table that is used in the upper layer side control, and the layer control decision table for deciding which layer control is performed to relay the acquired data.

The route information table that is used in the lower layer side control, for example, is a routing table in which a MAC address or an IP address of the on-board ECU 3, the communication device 1 outside the vehicle, and the diagnostic device 5 that are connected to each of the in-vehicle communication units 23 is associated with a physical port number of the in-vehicle communication units 23. The routing table in which the MAC address of the on-board ECU 3 or the like is associated with the physical port number of the in-vehicle communication unit 23 to which the on-board ECU 3 or the like is connected is used in control in layer 2 relay (a L2 switch). The routing table in which the IP address of the on-board ECU 3 or the like is associated with the physical port number of the in-vehicle communication unit 23 to which the on-board ECU 3 or the like is connected is used in control in layer 3 relay (a L3 switch).

In the preferential information table that is used in the upper layer side control, for example, information relevant to a preference order in a request SID (a service ID) that is used in the diagnostic communication protocol defined by UDS is stored. Alternatively, in the preferential information table, information relevant to a preference order that is used in quality of service (QoS) may be stored.

FIG. 3 is an explanatory diagram illustrating one aspect of the layer control decision table included in the relay control information. The layer control decision table for deciding which layer control is performed to the acquired data, for example, includes a port number such as TCP port number or a UDP port number included in data such as an IP packet, and a hierarchy (a relay layer) when relaying data including the port number, as a management item (field).

In the field of the port number, the port number included in the data such as the IP packet acquired by the control unit 20 through the in-vehicle communication unit 23 is stored. The port number stored in the field of the port number is not limited to a single port number, and may indicate the range of the port number.

In the field of the hierarchy (the relay layer) when relaying the data, information indicating in which relay layer the data such as the IP packet including the corresponding port number (a port number stored in the same record) is relayed is stored, and for example, the upper-layer relay unit 201 or the lower-layer relay unit 202 that are a processing unit included in the control unit 20 are stored as the information indicating the relay layer. In this embodiment, the lower-layer relay unit 202 includes a layer 3 relay unit 2021 and a layer 2 relay unit 2022, and the layer 3 relay unit 2021 or the layer 2 relay unit 2022 is stored in association with each of the corresponding port numbers in the drawing.

Even though the details will be described below, the information (data) relevant to the maintenance processing output (transmitted) from the diagnostic device 5 or the external server 100 is communicated by using a port number different from that of the data that is transmitted and received between the on-board ECUs 3 mounted on the vehicle C. Accordingly, the control unit 20 is capable of efficiently deciding in which hierarchy the data is relayed, that is, which relay unit of the upper-layer relay unit 201 and the lower-layer relay unit 202 (the layer 3 relay unit 2021 and the layer 2 relay unit 2022) relays the data, by referring to the layer control decision table, on the basis of the acquired data such as the IP packet.

In this embodiment, the hierarchy for performing the relay control is decided by using the port number, but the present disclosure is not limited thereto. The control unit 20, for example, may specify the external device such as the network N outside the vehicle or the diagnostic device 5, on the basis of an IP address (a source address) of a transmission source of the data, and may decide the hierarchy for performing the relay control. Alternatively, in a case where a CAN protocol is used by the in-vehicle communication unit 23, the control unit 20 may specify a CAN message output from the external device such as the network N outside the vehicle or the diagnostic device 5, on the basis of CAN-ID, and may decide the hierarchy for performing the relay control. In this case, in the layer control decision table, the IP address or CAN-ID and the information indicating in which hierarchy the relay is performed are stored in associated with each other.

Figure 4:
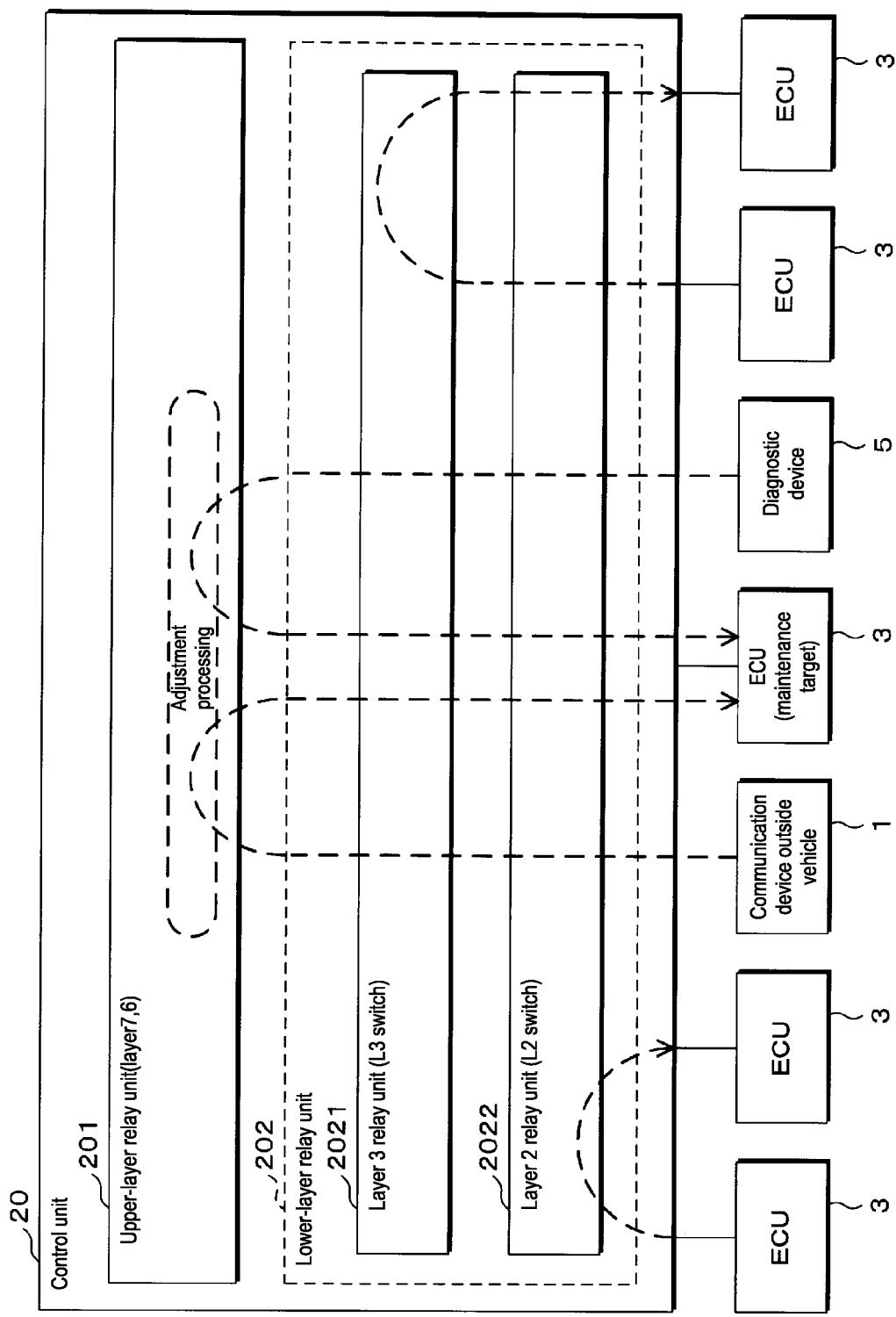
FIG. 4 is an explanatory diagram illustrating one aspect of relay processing of the on-board relay device.

FIG. 4 is an explanatory diagram illustrating one aspect of relay processing of the on-board relay device 2. As described above, the control unit 20 of the on-board relay device 2 includes the upper-layer relay unit 201 and the lower-layer relay unit 202. In this embodiment, the lower-layer relay unit 202 includes the layer 3 relay unit 2021 and the layer 2 relay unit 2022.

The layer 2 relay unit 2022, for example, performs relay processing in a data link layer of an OSI7 hierarchy reference model, and functions as a layer 2 switch. The layer 3 relay unit 2021, for example, performs relay processing in a network layer of an OSI7 hierarchy reference model, and functions as a layer 3 switch.

The upper-layer relay unit 201, for example, performs relay processing in a presentation layer or an application layer of an OSI7 hierarchy reference model, and performs relay processing including preferential processing based on QoS and preferential processing based on a request SID or a response SID that is defined by UDS. Alternatively, the upper-layer relay unit 201 may perform processing relevant to security for verifying the validity of the acquired data and relaying only valid data. In a case where the in-vehicle communication units 23 using different protocols such as Ethernet and CAN are mixed, the upper-layer relay unit 201 may relay the data by performing protocol conversion between different protocols such as Ethernet and CAN. In addition, in a case where the conflict of a plurality of maintenance processings with respect to any one on-board ECU 3 occurs, the upper-layer relay unit 201 performs adjustment processing in the plurality of maintenance processings.

As described above, the control unit 20 of the on-board relay device 2 may include the software processing unit such as CPU performing the software processing, and the hardware processing unit such as FPGA performing the hardware processing. In this case, the software processing unit such as CPU may function as the upper-layer relay unit 201, and may perform the upper layer side control for relay based on an upper side layered protocol. Then, the hardware processing unit such as FPGA may function as the lower-layer relay unit 202 (the layer 3 relay unit 2021 and the layer 2 relay unit 2022), and may perform the lower layer side control for relay based on a lower side layered protocol. According to such a configuration, comparatively simple relay processing of the layer 2 relay or the layer 3 relay can be performed at a high speed by the lower-layer relay unit 202 using FPGA or the like. In addition, the relay processing that requires the adjustment processing described above can be efficiently performed by the upper-layer relay unit 201 such as CPU or the like.

The upper-layer relay unit 201 and the lower-layer relay unit 202 (the layer 3 relay unit 2021 and the layer 2 relay unit 2022) that are included in the control unit 20 are configured by using a physical layer that is the in-vehicle communication unit 23 as the lowermost layer, and by stacking the layer 2 relay unit 2022, the layer 3 relay unit 2021, and the upper-layer relay unit 201 in this order.

The data acquired through the in-vehicle communication unit 23 is first processed by the layer 2 relay unit 2022. The layer 2 relay unit 2022, for example, specifies data that is relayed in a layer 2, in accordance with the port number set in the layer control decision table, and relays the data. The layer 2 relay unit 2022 forwards data that is relayed in a layer 3 or higher to the layer 3 relay unit 2021. The layer 3 relay unit 2021 specifies the data that is relayed in the layer 3 with respect to the data forwarded from the layer 2 relay unit 2022, for example, in accordance with the port number set in the layer control decision table, and relays the data. The layer 3 relay unit 2021 forwards data that is relayed in the upper layer to the upper-layer relay unit 201. The upper-layer relay unit 201 performs, for example, the decision of the preference order based on QoS, or the detection of the conflict of a plurality of data pieces and adjustment processing with respect to the conflict, with respect to the data forwarded from the layer 3 relay unit 2021, on the basis of a value or contents included in the data, and then, relays the data.

In an example illustrated in this embodiment, the information relevant to the maintenance processing output from the external server 100 through the communication device 1 outside the vehicle, and the information relevant to the maintenance processing output from the diagnostic device 5 are approximately simultaneously transmitted to any one on-board ECU 3 to be the maintenance target, and thus, the conflict of the plurality of maintenance processings occurs. In a case where the conflict occurs by transmitting the information relevant to the plurality of maintenance processings to any one on-board ECU 3 to be the maintenance target, the upper-layer relay unit 201 performs adjustment processing with respect to a request of the plurality of maintenance processings to solve the conflict.

In a case where the conflict occurs by transmitting the information relevant to the plurality of maintenance processings transmit, the upper-layer relay unit 201, for example, may preferentially perform the adjustment processing to the information relevant to the maintenance processing output from an external device in which TCP connection is previously established, with the on-board ECU 3 to be subjected to the maintenance processing. That is, the information relevant to the maintenance processing is transmitted to the on-board ECU 3 to be subjected to the maintenance processing from any one external device of the external server 100 and the diagnostic device 5, and the TCP connection in TCP/IP is established between any one external device and the on-board ECU 3 through the relay of the on-board relay device 2. Even in a case where the information relevant to the maintenance processing is transmitted to the on-board ECU 3 from the other external device until the TCP connection is annihilated or cut, the upper-layer relay unit 201 maintains the TCP connection that is previously established, continues the communication between any one external device and the on-board ECU 3, and stores (buffers) the information relevant to the maintenance processing transmitted from the other external device, for example, in the storage unit 21. After the communication between any one external device and the on-board ECU 3 is normally ended, and the TCP connection is annihilated, the upper-layer relay unit 201 relays the information relevant to the maintenance processing transmitted from the other external device that is stored (buffered) in the storage unit 21 to the on-board ECU 3.

Alternatively, even in a case where the transmission of the information relevant to the maintenance processing is already started between any one external device and the on-board ECU 3, the upper-layer relay unit 201 may preferentially relay the communication from the other external device to the on-board ECU 3 when the information relevant to the maintenance processing having a higher degree of urgency than that of the information relevant to the maintenance processing is output from the other external device. In this case, the upper-layer relay unit 201 stores (buffers) information (the information relevant to the maintenance processing) output from any one external device in which the transmission is previously started in the storage unit 21, and interrupts or suspends the processing of relaying the information to the on-board ECU 3. Then, after the communication from the other external device that is preferred is ended, the upper-layer relay unit 201 may restart the relay processing being interrupted or suspended.

In a case where the information relevant to the maintenance processing with respect to any one on-board ECU 3 is output from the external device through the local communication unit and the remote communication unit, and a conflict occurs, the upper-layer relay unit 201 may preferentially perform the adjustment processing to the information relevant to the maintenance processing output from the diagnostic device 5 that is connected to the local communication unit. By performing the adjustment processing to the information relevant to the maintenance processing output from the diagnostic device 5 connected to the local communication unit prior to the external server 100 connected through the remote communication unit and the communication device 1 outside the vehicle, it is possible to comparatively easily ensure communication quality and to reliably respond to the request of the maintenance processing from the diagnostic device 5 connected to the local communication unit.

In a case where the information relevant to the maintenance processing with respect to any one on-board ECU 3 is output from the external device through the local communication unit and the remote communication unit, and a conflict occurs, the upper-layer relay unit 201 may preferentially perform the adjustment processing to the information relevant to the maintenance processing output from the external server 100 connected through the communication device 1 outside the vehicle that is connected to the remote communication unit. By performing the adjustment processing to the information relevant to the maintenance processing output from the external server 100 prior to the diagnostic device 5 connected to the local communication unit, it is possible to prioritize the latest information retained in the external server 100 and to reliably respond to the request of the maintenance processing with high information freshness.

In a case where a conflict occurs, the upper-layer relay unit 201 stores (buffers) the information relevant to the maintenance processing transmitted from the external device that is not preferentially relayed, for example, in the storage unit 21, but the present disclosure is not limited thereto. In a case where a conflict occurs, the upper-layer relay unit 201 may output a suspend request signal for requesting the interruption or the suspension of the transmission (the output) of the information relevant to the maintenance processing to the external device that is not preferentially relayed, that is, the external device that is determined to have a low degree of priority in an adjustment result. Then, the upper-layer relay unit 201 may output a resume request signal for requesting the start or the restart of the transmission (the output) of the information relevant to the maintenance processing to the external device that is determined to have a low degree of priority, after the communication from the other external device that is preferred is ended.

FIG. 5 is a flowchart illustrating the processing of the control unit 20 of the on-board relay device 2 according to this embodiment. The control unit 20 of the on-board relay device 2, for example, constantly performs the following processing in a state where the vehicle C is activated (the IG switch 6 is On) or in a state where the vehicle C is stopped (the IG switch 6 is Off).

The control unit 20 of the on-board relay device 2 acquires data through the in-vehicle communication unit 23 (S101). The on-board ECU 3, the diagnostic device 5, and the communication device 1 outside the vehicle are connected to each of the in-vehicle communication units 23, and the control unit 20 acquires (receives) the data output (transmitted) from the on-board ECU 3, the diagnostic device 5, and the external server 100 connected through the communication device 1 outside the vehicle from each of the in-vehicle communication units 23.

The control unit 20 of the on-board relay device 2 determines whether or not the acquired data is the information relevant to the maintenance processing (S102). The control unit 20, for example, determines whether or not the data is the information relevant to the maintenance processing with reference to the layer control decision table, on the basis of the port number included in the acquired data such as the IP packet. As described above, in the layer control decision table, information is stored in which the port number, and the relay unit for performing the relay processing to data included in the port number are associated with each other. The control unit 20 may determine whether or not the acquired data is the information relevant to the maintenance processing by specifying the data included in the port number to be processed by the upper-layer relay unit 201 as the information relevant to the maintenance processing.

In a case where the acquired data is not the information relevant to the maintenance processing (S102: NO), the control unit 20 of the on-board relay device 2 performs the relay processing to the acquired data by the lower layer side control (S1021). In a case where the acquired data is not the information relevant to the maintenance processing, the control unit 20, for example, decides the hierarchy for relaying the data with reference to the layer control decision table, on the basis of the port number included in the acquired data, or a MAC address or IP indicating a transmission destination, and performs the relay processing by the lower layer side control in the layer 3 or the layer 2. That is, the control unit 20 functions as the L3 switch or the L2 switch.

In a case where the acquired data is the information relevant to the maintenance processing (S102: YES), the control unit 20 of the on-board relay device 2 starts the processing in the upper layer control by using the data as the information relevant to the maintenance processing, without performing the relay processing to the acquired data by the lower layer side control (S103). In a case where the acquired data is the information relevant to the maintenance processing transmitted from the external server 100 or the diagnostic device 5 that is the external device, the control unit 20 starts the processing in the upper layer control by using the data as the information relevant to the maintenance processing, without performing the relay processing to the acquired data by the lower layer side control. That is, the information relevant to the maintenance processing is handled as input data of a program (an application) that is executed by the control unit 20, and is processed by the function of the application.

The control unit 20 of the on-board relay device 2 specifies the on-board ECU 3 to be subjected to the maintenance processing (S104). The control unit 20 extracts a transmission destination address included in the acquired data (the information relevant to the maintenance processing), and specifies the on-board ECU 3 to be subjected to the maintenance processing, on the basis of the transmission destination address.

The control unit 20 of the on-board relay device 2 determines whether or not the conflict of the plurality of maintenance processings occurs for the specified on-board ECU 3 (S105). The control unit 20 checks whether or not the data (the information relevant to the maintenance processing) transmitted from another external device is being relayed to the specified on-board ECU 3, and determines whether or not the conflict of the plurality of maintenance processings with respect to the specified on-board ECU 3 occurs. When performing the relay processing in the upper layer control, the control unit 20, for example, applies a session ID for each relay processing, and stores the session ID in the storage unit 21. Attribute information such as a transmission source address, the transmission destination address, and the port number is applied to or associated with the session ID. Accordingly, the control unit 20 is capable of determining whether or not the data (the information relevant to the maintenance processing) from another external device is already transmitted to the specified on-board ECU 3, with reference to information relevant to the session ID stored in the storage unit 21 at the current point.

In a case where the conflict of the maintenance processing with respect to the specified on-board ECU 3 does not occur (S105: NO), the control unit 20 of the on-board relay device 2 relays the information relevant to the maintenance processing to the on-board ECU 3 to be subjected to the maintenance processing (S1051). In a case where the conflict of the maintenance processing with respect to the specified on-board ECU 3 does not occur, it is not necessary to perform the adjustment processing, and thus, the control unit 20 relays the information relevant to the maintenance processing to the on-board ECU 3 to be subjected to the maintenance processing, without performing the adjustment processing.

In a case where the conflict of the maintenance processing with respect to the specified on-board ECU 3 occurs (S105: YES), the control unit 20 of the on-board relay device 2 performs the adjustment processing in the plurality of conflicting maintenance processings (S106). In a case where the conflict of the maintenance processing with respect to the specified on-board ECU 3 occurs, the control unit 20, for example, performs the adjustment processing in the plurality of conflicting maintenance processings by prioritizing the communication with the external device in which the TCP session is previously established. Alternatively, the control unit 20, for example, may perform the adjustment processing in the plurality of conflicting maintenance processings by deciding the preference order of the information, in accordance with the request SID included in the information of the plurality of conflicting maintenance processings.

The control unit 20 of the on-board relay device 2 relays the information relevant to the preferred maintenance processing to the on-board ECU 3 to be subjected to the maintenance processing, on the basis of an adjustment processing result (S107). The control unit 20 relays the information relevant to the preferred maintenance processing to the on-board ECU 3 to be subjected to the maintenance processing, on the basis of the adjustment processing result, in the plurality of conflicting maintenance processings.

The control unit 20 of the on-board relay device 2 stores the information relevant to the maintenance processing other than the preferred prioritize maintenance processing (the other maintenance processing) in the storage unit 21, in the plurality of conflicting maintenance processings (S108). The control unit 20 stores (buffers) the information relevant to the other maintenance processing in the storage unit 21 without relaying the information relevant to the maintenance processing other than the preferred maintenance processing (the other maintenance processing) to the on-board ECU 3 to be subjected to the maintenance processing or while interrupting or suspending the relay that is already started, in the plurality of conflicting maintenance processings. The control unit 20 may perform the relay processing of S107 and the storage processing of S108, for example, by parallel processing of a plurality of processes or threads.

The control unit 20 of the on-board relay device 2 relays the information relevant to the preferred maintenance processing to the on-board ECU 3 to be subjected to the maintenance processing, and then, relays the information relevant to the other maintenance processing (the maintenance processing other than the preferred maintenance processing) stored in the storage unit 21 to the on-board ECU 3 to be subjected to the maintenance processing (S109). After the information relevant to the preferred maintenance processing is relayed to the on-board ECU 3 to be subjected to the maintenance processing, that is, the relay of the information relevant to the maintenance processing output from the preferred external device is normally ended and completed, the control unit 20 starts or restarts the relay of the information relevant to the maintenance processing output from the other external device that is suspended or interrupted.

The control unit 20 may output matters relevant to the occurrence of a conflict due to the information relevant to the plurality of maintenance processings, and the result of the adjustment processing with respect to the conflict, for example, to the display device 7, the external server 100, or the diagnostic device 5. By outputting such matters relevant to the occurrence of the conflict and the result of the adjustment processing to the display device 7, the external server 100, or the diagnostic device 5, the matters can be notified to an operator of the vehicle C, a manager of the external server 100, or an operator of the diagnostic device 5.

According to this embodiment, when performing the relay control in the lower layer such as the L2 switch or the L3 switch and performing the relay control in the upper layer such as the application layer, the on-board relay device 2, for example, processes the information relevant to the maintenance processing that is transmitted to the on-board ECU 3 from the external device such as the external server 100 or the diagnostic device 5 by the relay control in the upper layer. Accordingly, even in a case where the information relevant to the plurality of maintenance processings is duplicately transmitted to any one on-board ECU 3 from the diagnostic device 5 and the external server 100, and a conflict occurs due to the plurality of maintenance processings, the adjustment in the plurality of maintenance processings can be reliably performed by the relay control in the upper layer (the upper-layer relay unit 201), and the maintenance processing that is preferentially performed can be efficiently implemented.

According to this embodiment, the information relevant to the maintenance processing that is transmitted to the on-board ECU 3 from the external device such as the external server 100 or the diagnostic device 5 includes information for requesting the update processing of the program with respect to the on-board ECU 3 to be subjected to the maintenance processing, the diagnostic processing, or the initialization processing, and for example, is based on the diagnostic communication protocol that is defined by UDS. Accordingly, the on-board ECU 3 mounted on the vehicle C performs the control based on the UDS, and even in a case where a conflict occurs due to a plurality of diagnostic communication protocols, the conflict can be efficiently solved by performing the adjustment processing.

According to this embodiment, when performing the adjustment processing by the relay control in the upper layer (the upper-layer relay unit 201), the on-board relay device 2 decides the preferred external device, for example, on the basis of the order in which the TCP connection is established. Alternatively, when performing the adjustment processing, the on-board relay device 2 performs the adjustment processing on the basis of the service ID (UDS) included in the information relevant to the plurality of conflicting maintenance processings. Accordingly, the adjustment processing in the plurality of conflicting maintenance processings can be efficiently performed.

It should be considered that the embodiments disclosed as described above are an example in all respects and are not restrictive. The scope of the present disclosure is indicated by the claims but not the meaning described above, and is intended to include the meaning equivalent to the claims and all modifications within the claims.

The invention claimed is:

1. An on-board relay device to be mounted on a vehicle, the device comprising:
   a plurality of communication units for communicating with a plurality of on-board ECUs to be mounted on the vehicle and an external device outside the vehicle; and
   a control unit performing control relevant to relay of communication between the plurality of on-board ECUs, the control unit including an upper-layer relay unit and a lower-layer relay unit, the upper-layer relay unit stacked on top of the lower-layer relay unit,
   wherein the external device includes an external server and a diagnostic device,
   the plurality of communication units include a remote communication unit to which a communication device outside the vehicle for communicating with the external server is connected, and a local communication unit to which the diagnostic device is connected, and
   the control unit
   performs lower layer side control of the lower-layer relay unit for relay based on a lower side layered protocol communication, and upper layer side control of the upper-layer relay unit for relay based on an upper side layered protocol rather than the lower side layered protocol,
   determines whether or not acquired data is information relevant to maintenance processing,
   performs adjustment processing with respect to a conflict of a plurality of maintenance processings, wherein the conflict is when the acquired data relevant to maintenance processing is transmitted simultaneously by the external server and the diagnostic device, the adjustment processing is performed by the upper-layer relay unit using the upper layer side control when information relevant to the plurality of maintenance processings with respect to any one on-board ECU of the plurality of on-board ECUs is input through the local communication unit and the remote communication unit, and
   performs relay processing using the lower layer side control of the lower-layer relay unit when the acquired data is not the information relevant to the maintenance processing.

2. The on-board relay device according to claim 1, wherein the maintenance processing includes update processing of a program that is executed by the on-board ECU, and diagnostic processing or initialization processing with respect to the on-board ECU.

3. The on-board relay device according to claim 2, wherein a hierarchy in the communication is a hierarchy based on an open systems interconnection model,
   the lower side layered protocol is a protocol of a data link layer or a network layer, and
   the upper side layered protocol is a protocol of a presentation layer or an application layer.

4. The on-board relay device according to claim 2, wherein a protocol of communication with the external device that is performed through the remote communication unit and the local communication unit is TCP/IP, and
   the control unit specifies communication with the diagnostic device or the external server on the basis of a port number in TCP/IP.

5. The on-board relay device according to claim 2, wherein when information relevant to maintenance processing with respect to any one on-board ECU of the plurality of on-board ECUs is input through the local communication unit and the remote communication unit, the control unit preferentially performs the adjustment processing to information relevant to maintenance processing output from the external device in which connection is previously established, with the any one on-board ECU.

6. The on-board relay device according to claim 2, wherein the protocol of the communication with the external device that is performed through the remote communication unit and the local communication unit is based on unified diagnostic services (UDS), and
   when information relevant to maintenance processing with respect to any one on-board ECU of the plurality of on-board ECUs is input through the local communication unit and the remote communication unit, the control unit performs the adjustment processing on the basis of a service ID in the UDS.

7. The on-board relay device according to claim 1, wherein a hierarchy in the communication is a hierarchy based on an open systems interconnection model,
   the lower side layered protocol is a protocol of a data link layer or a network layer, and
   the upper side layered protocol is a protocol of a presentation layer or an application layer.

8. The on-board relay device according to claim 7, wherein a protocol of communication with the external device that is performed through the remote communication unit and the local communication unit is TCP/IP, and
   the control unit specifies communication with the diagnostic device or the external server on the basis of a port number in TCP/IP.

9. The on-board relay device according to claim 7, wherein when information relevant to maintenance processing with respect to any one on-board ECU of the plurality of on-board ECUs is input through the local communication unit and the remote communication unit, the control unit preferentially performs the adjustment processing to information relevant to maintenance processing output from the external device in which connection is previously established, with the any one on-board ECU.

10. The on-board relay device according to claim 7, wherein the protocol of the communication with the external device that is performed through the remote communication unit and the local communication unit is based on unified diagnostic services (UDS), and
when information relevant to maintenance processing with respect to any one on-board ECU of the plurality of on-board ECUs is input through the local communication unit and the remote communication unit, the control unit performs the adjustment processing on the basis of a service ID in the UDS.

11. The on-board relay device according to claim 1, wherein a protocol of communication with the external device that is performed through the remote communication unit and the local communication unit is TCP/IP, and
the control unit specifies communication with the diagnostic device or the external server on the basis of a port number in TCP/IP.

12. The on-board relay device according to claim 11, wherein when information relevant to maintenance processing with respect to any one on-board ECU of the plurality of on-board ECUs is input through the local communication unit and the remote communication unit, the control unit preferentially performs the adjustment processing to information relevant to maintenance processing output from the external device in which connection is previously established, with the any one on-board ECU.

13. The on-board relay device according to claim 11, wherein the protocol of the communication with the external device that is performed through the remote communication unit and the local communication unit is based on unified diagnostic services (UDS), and
when information relevant to maintenance processing with respect to any one on-board ECU of the plurality of on-board ECUs is input through the local communication unit and the remote communication unit, the control unit performs the adjustment processing on the basis of a service ID in the UDS.

14. The on-board relay device according to claim 1, wherein when information relevant to maintenance processing with respect to any one on-board ECU of the plurality of on-board ECUs is input through the local communication unit and the remote communication unit, the control unit preferentially performs the adjustment processing to information relevant to maintenance processing output from the external device in which connection is previously established, with the any one on-board ECU.

15. The on-board relay device according to claim 1, wherein the protocol of the communication with the external device that is performed through the remote communication unit and the local communication unit is based on unified diagnostic services (UDS), and
when information relevant to maintenance processing with respect to any one on-board ECU of the plurality of on-board ECUs is input through the local communication unit and the remote communication unit, the control unit performs the adjustment processing on the basis of a service ID in the UDS.

16. An information processing method allowing a computer to execute processing of:
executing lower layer side control for relay based on a lower side layered protocol communication, and upper layer side control for relay based on an upper side layered protocol rather than the lower side layered protocol;
determining whether or not acquired data is information relevant to maintenance processing;
adjusting a conflict of a plurality of maintenance processings, wherein the conflict is when the acquired data relevant to maintenance processing is transmitted simultaneously by an external server and a diagnostic device, the adjustment processing is performed by the upper layer side control when information relevant to the plurality of maintenance processings with respect to any one on-board ECU is input through a local communication unit for communicating with a diagnostic device and a remote communication unit for communicating with an external server; and
performing relay processing by the lower layer side control when the acquired data is not the information relevant to the maintenance processing.

17. A program allowing a computer to execute processing of:
executing lower layer side control for relay based on a lower side layered protocol in communication, and upper layer side control for relay based on an upper side layered protocol rather than the lower side layered protocol;
determining whether or not acquired data is information relevant to maintenance processing;
adjusting a conflict of a plurality of maintenance processings, wherein the conflict is when the acquired data relevant to maintenance processing is transmitted simultaneously by an external server and a diagnostic device, the adjustment processing is performed by the upper layer side control when information relevant to the plurality of maintenance processings with respect to any one on-board ECU is input through a local communication unit for communicating with a diagnostic device and a remote communication unit for communicating with an external server; and
performing relay processing by the lower layer side control when the acquired data is not the information relevant to the maintenance processing.

* * * * *